May 26, 1964

W. T. BIRGE 3,134,463

ELECTRIC BRAKE ACTUATING MECHANISM

Filed Sept. 12, 1962

INVENTOR.
William T. Birge
BY
Harness, Dickey & Pierce
ATTORNEYS

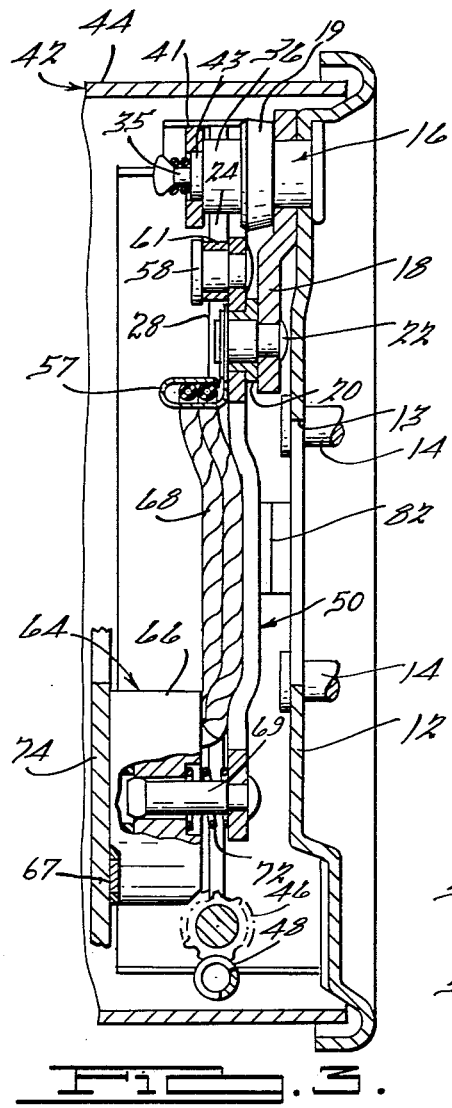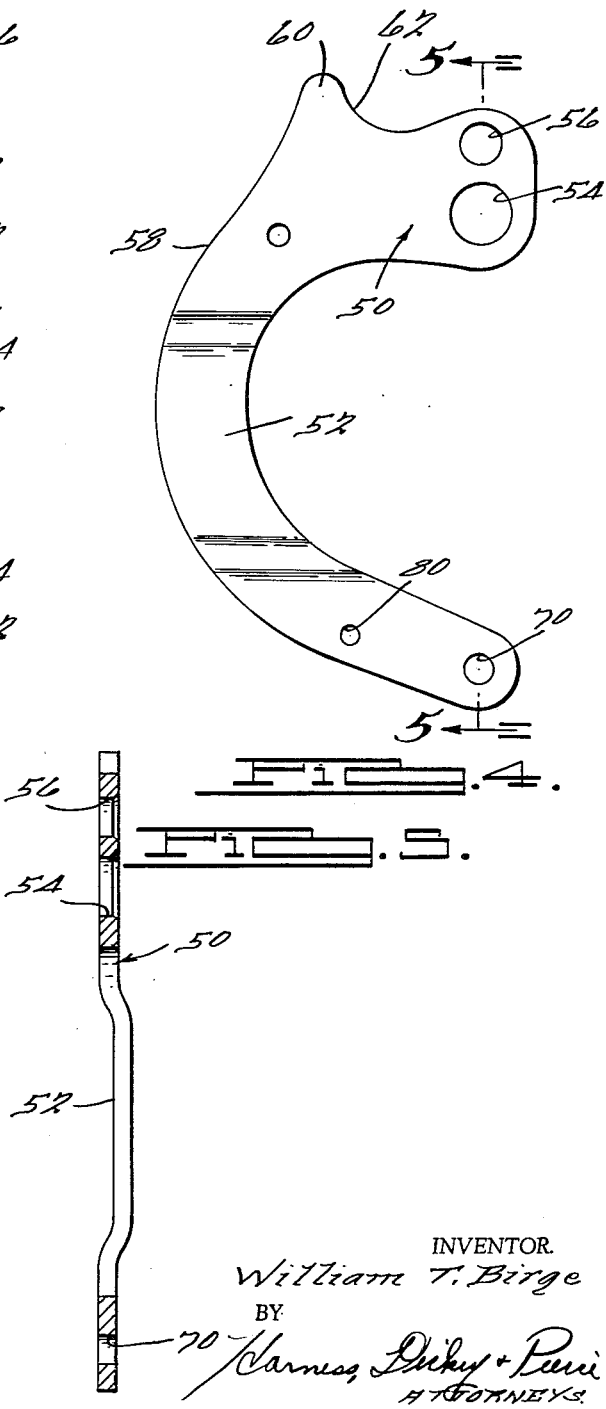

United States Patent Office 3,134,463
Patented May 26, 1964

3,134,463
ELECTRIC BRAKE ACTUATING MECHANISM
William T. Birge, Plymouth, Mich., assignor to Kelsey-Hayes Company, Romulus, Mich., a corporation of Delaware
Filed Sept. 12, 1962, Ser. No. 223,101
6 Claims. (Cl. 188—138)

This invention relates to electric brakes, and more particularly to an electric brake construction for use on an automotive vehicle.

In conventional hydraulically actuated brakes, a pair of brake shoes are pivotally secured to a stationary brake backup plate and are caused to move into contact with a brake drum by the actuation of pistons in a hydraulic brake cylinder responsively to fluid pressure applied to the brake cylinder. In an electrically actuated system, the brake shoes are moved by means responsive to an electrical current; the latter system is exemplified by United States patent to William F. Penrose, No. 2,273,065. In an electrically operative system a lever arm is pivotally secured to the brake backup plate such that rotation of the lever arm causes movement of the brake shoes into contact with the brake drum. At the end of the lever arm is secured an electromagnet which is usually maintained in sliding contact with an armature plate which is secured to and moves with the brake drum. Upon energization of the electromagnet, a magnetic flux path is provided from the electromagnet to the armature plate resulting in a magnetic attraction between the electromagnet and the armature plate thereby causing the electromagnet to be moved with the armature plate as it rotates. Movement of the electromagnet causes a corresponding pivotal movement of the lever arm which in turn causes the brake shoes to be moved into contact with the brake drum resulting in braking action.

The electromagnet itself can be of a construction generally as shown in the above identified United States patent or alternatively, can be of a construction as indicated in my copending patent application No. 198,330 filed May 28, 1962. In the latter patent application the electromagnet is essentially piloted over a pin member secured to the lever arm and has an eccentric lug having a bore therein which is piloted over a second pin which is secured to the lever arm. The opposite end of the lever arm is rotatably secured to a bushing which is fixed relative to the brake backup plate. Because of the geometry of the parts involved, the braking force as applied to the electromagnet results in a couple tending to cock or twist the lever arm. In practice, the lever arm is located proximate the web of one of the brake shoes such that with the arm in an extreme position, and if the twisting or cocking is severe enough, it can become locked against the web of the shoe thereby impairing its performance. This twisting or cocking of the lever arm can also result in damage to the bushing about which it is pivotally secured, since the bushing is primarily designed to react bearing loads perpendicular to its axis and not a turning couple in a plane including the axis. Again, if the lever arm were allowed to twist excessively, the face of the electromagnet engaging the rotating armature could become angulated relative to the armature plate resulting in an air gap causing a loss of braking and excessive wear on the electromagnet face. Therefore, it is an object of this invention to provide an electric brake of the above described type in which cocking of the lever arm is substantially prevented. It is a further object of this invention to provide an electric brake generally of the above described type in which twisting forces of the lever arm about the bushing on which the lever arm is pivoted are minimized or substantially eliminated.

Other objects, features, and advantages of the present invention will become apparent from the subsequent description and appended claims, taken in conjunction with the accompanying drawings, in which:

FIGURE 3 is a sectional view with some parts shown broken away, of the electric brake assembly shown in FIGURE 1 taken substantially along the line 3—3 of FIGURE 1;

FIGURE 4 is a plan view depicting the lever arm of the brake assembly as shown in FIGURES 1 and 3; and FIGURE 5 is a sectional view of the lever arm of FIGURE 4 taken substantially along the line 5—5 of FIGURE 4.

Figure 1:
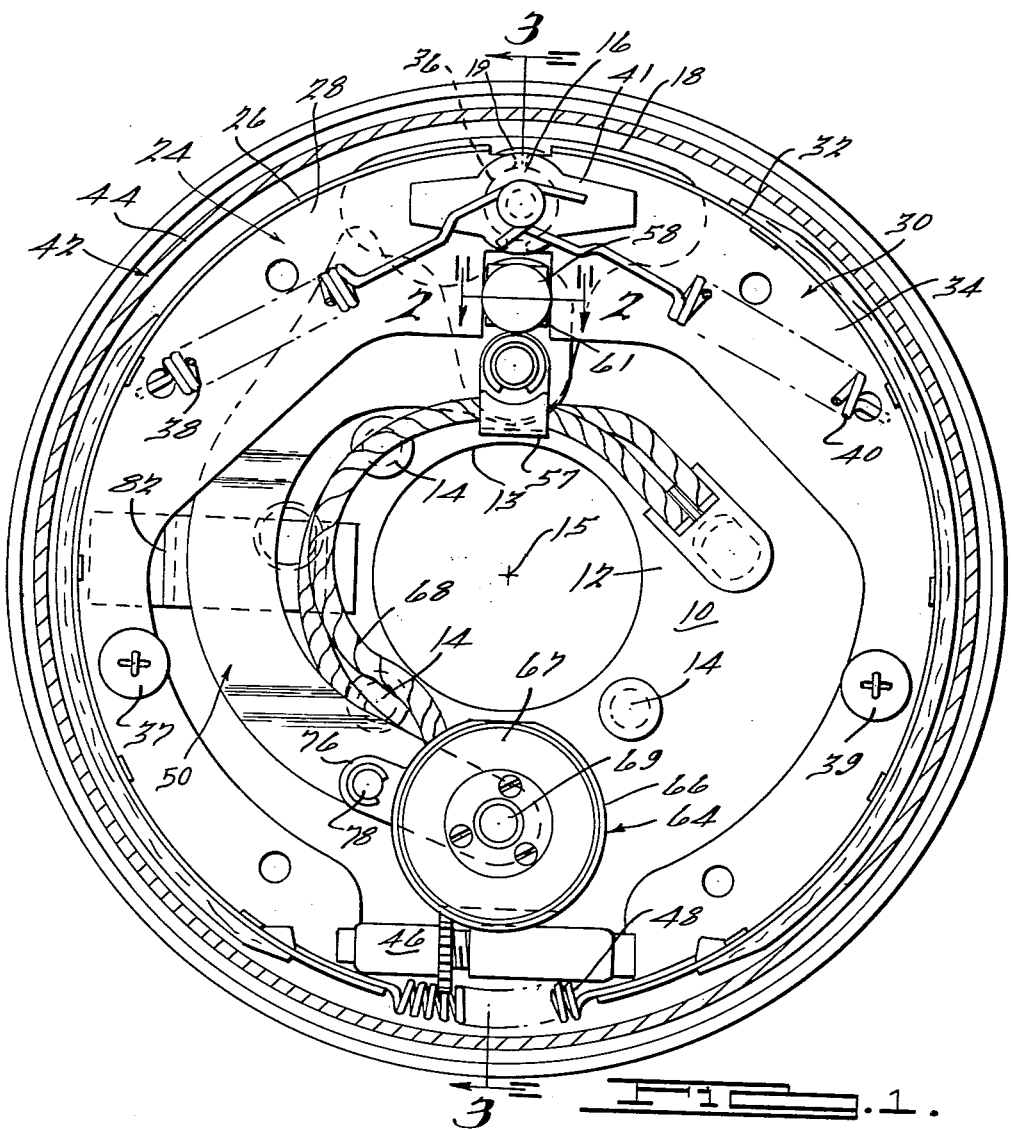
FIGURE 1 is a side elevational view with some parts shown in section and others broken away, of an electric brake embodying the features of this invention.

Looking now to FIGURE 1, an electric brake assembly 10 includes a brake backup plate 12 having a centrally located bore 13 with an axis 15, adapted to be secured to a steering knuckle (not shown) via a plurality of radially spaced, axially extending studs 14. An anchor pin 16 is secured vertically, upwardly from the axis 15 to the backup plate 12 and axially retains a generally vertically downwardly extending bushing retaining plate 18 between an enlarged diameter portion 19 and the backup plate 12. The bushing plate 18 can be keyed or otherwise fixed to the backup plate 12 to prevent rotation of the bushing plate 18 about the anchor pin 16. A lever arm bushing 20 is secured by means of a rivet 22 to the vertically lower portion of the bushing retaining plate 18.

The electric brake assembly 10 has a primary brake shoe 24 comprised of an arcuately shaped, flat lining bearing portion 26 having fixed thereto a generally upright web portion 28. A secondary brake shoe 30 is similarly constructed with a lining bearing portion 32 and web portion 34. To facilitate the following description, the central axis 15 can be considered to move in a forward direction in translation (i.e., right to left as viewed in FIGURE 1) as the vehicle with which the assembly 10 is associated moves in a forward direction; thus the primary shoe 24 is located on the forward side of the central axis 15 and the secondary shoe 30 is located on the opposite side.

The webs 28 and 34 of the brake shoes 24 and 30, respectively, are wide at one end tapering nonuniformly to a smaller section at their opposite extremities. The brake shoes 24 and 30 have the wide ends of their web portions 28 and 34, respectively, normally maintained in engagement on opposite sides of a reduced diameter reaction portion 36 of the anchor pin 16 by means of a pretension on coil springs 38 and 40, respectively, each of which has a hooked end secured to a bore in the associated web 28, 34 and has its other end secured about an outer end portion 35 of the anchor pin 16. An enlarged knob at the termination of the end portion 35 of anchor pin 16 restrains the ends of the springs 38 and 40, preventing them from moving axially outwardly off the end portion 35.

The brake shoes 24 and 30 are axially restrained by means of spring loaded retaining pin assemblies 37 and 39, respectively, which are secured to the backup plate 12 and are of a construction well known in the art, the details of which do not constitute a part of this invention. A butterfly bracket 41 is disposed upon and extends generally outwardly from opposite sides of a boss portion 43 located between the reaction portion 36 and the end 35 of the anchor pin 16 and is axially held on the boss 43 by means of the ends of the springs 38 and 40. The bracket 41 partially overlaps the wide end of webs 28 and 34 and thereby axially restrains the brake shoes 24 and 30 from movement in an axially outward direction.

A brake drum 42 (only partially shown) has an axially extending annular flange portion 44 which is engageable with the linings on portions 26 and 32 of brake shoes 24 and 30, respectively, whereby rotation of the brake drum 42 can be retarded in a conventional manner. The small end of the webs 28 and 34 cooperate with a brake adjustment assembly 46 whereby the position of the brake shoes 24 and 30 can be adjusted relative to the annular flange 44 of the brake drum 42 in a manner well known in the art. The small ends of the brake shoes 24 and 30 are held against opposite ends of the assembly 46 by means of a coil spring 48 which is secured at its opposite ends to the brake shoes 24 and 30 under a pre-tension.

With the brake assembly 10 as shown in FIGURE 1, as the vehicle with which it is associated moves in a forward direction, the brake drum 42 rotates in a counterclockwise direction. As the brake actuating mechanism is applied, the primary shoe 24 is caused to move radially outwardly into engagement with the flange 44 of the brake drum 42 thereby causing braking action. When the vehicle is moving in reverse, the brake drum 42 rotates in a clockwise direction, as viewed in FIGURE 1. As the brake actuating mechanism is again applied, the secondary brake shoe 30 is moved radially outwardly into engagement with the flange 44 of the brake drum 42, thereby causing braking action.

Figure 2:
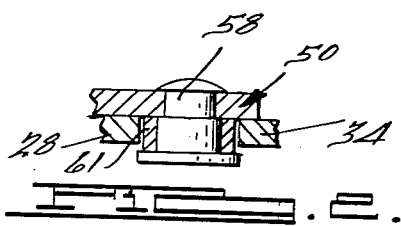
FIGURE 2 is a fragmentary sectional view of a portion of the electric brake assembly of FIGURE 1 taken substantially along the line 2—2 in FIGURE 1.

The brake shoes 24 and 30 are actuated via a lever arm 50. The lever arm 50 (FIGURE 4) is of a generally flat construction having an intermediate indented portion 52, serving a purpose to be presently seen, and is of a generally arcuate contour to facilitate clearance, extending about the central axis 15 on its forward side. Located at the upper end of the arm 50 is a pivot location bore 54 by which the lever arm 50 can be rotatably disposed over a reduced diameter portion of the lever arm support boss 20 which defines the pivotal axis of the arm 50 relative to the backup plate 12. The lever arm 50 is axially secured to the support boss 20 by means of the rivet 22 which also holds a wire support bracket 56. Disposed vertically upwardly from the location or support bore 54 is a bore 56 through which is inserted a rivet member 58 (FIGURE 2) which thereby secures an actuating block member 61 to the outer surface of the actuating lever 50. The actuating block 61, as can be seen in FIGURES 1 and 2, is located proximate the large ends of the webs 28 and 34 of the brake shoes 24 and 30, respectively. Thus, as the lever arm 50 is pivoted about the bushing 20 in a counterclockwise direction (i.e., as in forward braking), the actuating block 61 is moved into contact with the web 28 of the primary shoe 24, thereby causing that shoe to be moved radially outwardly and into contact with the flange 44 of the brake drum 42 thereby causing braking action. Conversely, as the lever arm 50 is pivoted in a clockwise direction about the bushing 20, the actuating block 61 is moved into engagement with the large end of the web 34, thereby moving the secondary brake shoe 30 radially outwardly into contact with the flange 44 of the brake drum 42 to thereby cause braking action. Note that in the normal position of the actuating lever 50, a portion thereof near its upper end or in the vicinity of the mounting bore 54 is axially overlapped by the web 28 of the primary shoe 24. The amount of this overlap, however, is limited since the outer edge 58 of the actuating lever 50 must be of a contour to allow adequate movement of the lever arm 50 in the clockwise direction, as in reverse braking, without interference with any of the other components. Looking to FIGURE 3, it can be seen that the lever arm 50 and the web 28 are axially proximate each other in this overlapping region. In forward braking, as the lever arm 50 is pivoted in a counterclockwise direction and as the primary brake shoe 24 moves radially outwardly, the amount of overlapping between the web 28 and the upper portion of the lever arm 50 is reduced. In order to maintain some overlapping, for a purpose to be presently seen, the outer edge 58 is contoured to define a radially outwardly extending projection or finger portion 60 which is located at the upper end of the lever arm 50 near the supporting bore 54. Since the entire lever arm 50 pivots at the bore 54, it can be appreciated that those points along the edge 58 closest to the bore 54 are moved radially outwardly a lesser extent (than those points more distant therefrom) as the lever arm 50 is pivoted in a counterclockwise direction. Thus the projection or finger 60, is located as close to the bore 54 as practicable, with the leading edge 62 thereof located at a point allowing clearance with the anchor pin 16 when the lever arm 50 is moved to its extreme clockwise position (i.e., as caused by rearward braking). Thus in the assembly as shown, with the lever arm 50 in its extreme counterclockwise position (i.e., as with forward braking) and with the primary shoe 24 moved to its radially outermost position, an overlapping relationship is maintained between the projection 60 and the web 28 of the primary shoe 24. In other words, the projection 60 in its normal position, overlaps the web 28 of the primary shoe 24 in the region of the projection 60, a distance greater than the distance of the maximum, relative separating travel between the web 28 and the arm 50 in that region (i.e., with lever arm 50 in its extreme counterclockwise position).

Secured to the opposite or lower end of the lever arm 50 is an electromagnet assembly 64 which can generally be of a construction as described in my previously mentioned copending United States patent application, and which electromagnet assembly 64 can function generally in a manner as disclosed by the above mentioned United States patent to William F. Penrose. In general, the electromagnet assembly 64 comprises an iron housing or magnet body 66 having a radially inner core portion about which is annularly wound an electric coil which can be energized by means of lead wires 68 which are held by the wire retaining clip 56. Located in the outer face of the housing 66 is a flat ring 67 of nonmagnetic, frictional material. The housing 66 is held to the lower end of the lever arm 50 via an axially outwardly extending pin 69 which is riveted or otherwise secured in a bore 70 at the lower end of the lever arm 50. The electromagnet housing 66 is biased axially outwardly by means of a spring 72 into engagement with a radially extending armature plate 74 which is secured to the brake drum 42. Thus, by means of the spring 72, the forward frictional face 67 is continuously maintained in light rubbing contact with the armature plate 74. In order to prevent the electromagnet assembly 64 from rotating about the pin 69, the housing 66 is provided with a lug 76 having an aperture through which extends a retaining pin 78 secured to the lever arm 50 at the bore 80. The electromagnet assembly 64 can be energized via a conventional brake actuating mechanism (not shown) via the conductors 68 which are nested in the indented, intermediate portion 52 of the arm 50. As the electromagnet assembly 64 is actuated, a flux path is completed through the armature plate 74 creating a magnetic attraction between the electromagnet assembly 64 and the armature plate 74, causing the electromagnet assembly 64 to move with the armature plate 74 thus causing the actuating lever arm 50 to be pivoted about the bushing 20. The actuating block 61 is then moved into contact with one or the other of the webs 28 and 34 of the brake shoes 24 and 30, respectively, depending upon the direction of rotation of the armature plate 74.

Looking now to FIGURE 3, it can be seen that the force exerted upon the electromagnet assembly 64 is applied to the pin 69 near its axially outer end at a point which is axially displaced from the area of support of the lever arm 50 about the support bushing 20. This axial offset results in a twisting moment being applied to the lever arm 50 about the support bushing 20. For forward braking, i.e. lever arm 50 being moved in a counterclockwise direction, this moment tends to tilt or cock the lever arm 50 axially outwardly about the support bushing 20. With the lever arm 50 in its extreme counterclockwise position and without the projection 60, the twist on the lever arm 50 would be reacted substantially solely by the support bushing 20. Since the support bushing 20 is not designed to react to the twisting forces, damage or destriction to the bushing 20 can result. Likewise, twisting of the lever arm 50 could cause its radially outer edge 58 to be moved axially into the plane of the web 28 of the primary shoe 24 such that upon release of the brake, jamming between the web 28 and the lever arm 50 could occur. If the twisting moment is of a high enough magnitude, the forward face 67 of the electromagnet assembly 64 could be partially or totally lifted from the armature 74, thereby creating an air gap impairing braking and causing excessive wear on the forward face 67. With the lever arm 50, however, constructed in a manner shown in FIGURE 4 with the addition of the projection 60, even with the lever arm 50 and the brake shoe 24 in their extreme positions during forward braking, the web 28 still is in overlapping relationship with the projection 60 such that the twisting moment is, in part at least, reacted by the engagement of the projection 60 with the web 28, thus preventing the effects previously mentioned.

For reverse braking the lever arm 50 is moved in a clockwise direction and a reverse moment occurs tending to move the lever arm 50 axially inwardly about the support bushing 20. This moment is reacted by means of a support pad 82 which is secured to the backup plate 12 in the vicinity of the indented, intermediate portion 52 of the lever arm 50 and axially proximate thereto. Thus, as the lever arm 50 is twisted to move axially inwardly, the intermediate portion 52 is moved into contact with the support pad 82, thereby preventing damage to the bushing 20, loss of braking and/or damage to the electromagnet assembly 64. As previously mentioned, the projection 60 is located proximate the mounting bore 54 with its leading edge 62 spaced sufficiently therefrom to allow clearance with the anchor pin 16 with the lever arm 50 in its extreme clockwise position.

Thus, with the electric brake assembly as shown and as described, a direct and simple means have been shown whereby cocking of the lever arm is prevented, thereby preventing damage to the electric brake assembly.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. An electric brake assembly operable with a brake drum rotatable about a central axis comprising a pair of brake shoes each having an arcuately shaped lining bearing portion and an upright web portion secured to said lining bearing portion, a brake backup plate, means for securing said brake shoes to said brake backup plate and for maintaining said brake shoes normally out of engagement with the brake drum, electrically actuable means for moving said brake shoes into engagement with said brake drum, said electrically actuable means including a generally flat lever arm axially disposed between said web portion of one of said shoes and said brake backup plate, means pivotally securing one end of said lever arm at a pivot location to said brake backup plate at a pivotal axis eccentric to the central axis and proximate to confronting ends of said brake shoes, said lever arm being generally arcuately shaped with its opposite end normally being located substantially diametrically from said one end relative to the central axis and with a portion of said lever arm proximate said pivot location at said one end normally being in axial overlapping relation relative to said web portion of said one of said shoes, electromagnet assembly means secured to said lever arm at said opposite end and actuable for causing pivoting of said lever arm about said pivotal axis in opposite directions from its normal position in accordance with the direction of rotation of said brake drum and for moving said lever arm substantially out of overlapping relationship relative to said web of said one of said brake shoes responsively to movement in one direction, said lever arm having a radially outer edge of a generally arcuate contour and having a generally radially outwardly extending projection located proximate to said pivot location at said one end and extending radially outwardly a distance such that said projection maintains said overlapping relationship with said web of said one of said brake shoes with said lever arm in its extreme position in said one direction, and means on said lever arm engageable with said confronting ends of said brake shoes for moving said brake shoes into engagement with said brake drum responsively to pivotal movement of said lever arm about said pivotal axis.

2. An electric brake assembly operable with a brake drum rotatable about a central axis comprising a pair of brake shoes each having an arcuately shaped lining bearing portion and an upright web portion secured to said lining bearing portion, a generally planar brake backup plate, means for securing said brake shoes to said brake backup plate and for maintaining said brake shoes normally out of engagement with the brake drum, electrically actuable means for moving said brake shoes into engagement with said brake drum, said electrically actuable means including a generally flat lever arm axially disposed between said web portion of one of said shoes and said brake backup plate, means pivotally securing one end of said lever arm at a pivot location to said brake backup plate at a pivotal axis eccentric to the central axis and proximate to confronting ends of said brake shoes, said lever arm being generally arcuately shaped with its opposite end normally being located substantially diametrically from said one end relative to the central axis and with a portion of said lever arm proximate said pivot location at said one end normally being in axial overlapping relation relative to said web portion of said one of said shoes, electromagnet assembly means secured to said lever arm at said opposite end and actuable for causing pivoting of said lever arm about said pivotal axis in opposite directions from its normal position in accordance with the direction of rotation of said brake drum and for moving said lever arm substantially out of overlapping relationship relative to said web of said one of said brake shoes responsively to movement in one direction, said lever arm having a radially outer edge of a generally arcuate contour and having a generally radially outwardly extending projection located proximate said pivotal location at said one end and overlapping said web of said one of said brake shoes in the area of said projection a distance greater than the distance of the maximum relative separating movement between said one of said brake shoes and said lever arm at said area, and means on said lever arm engageable with said confronting ends of said brake shoes for moving said brake shoes into engagement with said brake drum responsively to pivotal movement of said lever arm about said pivotal axis.

3. An electric brake assembly operable with a brake drum rotatable about a central axis comprising a pair of brake shoes each having an arcuately shaped lining bearing portion and an upright web portion secured to said lining bearing portion, a generally planar brake backup plate, an anchor pin secured to said backup plate and located substantially vertically upwardly from the central axis, means for securing said brake shoes to said brake backup plate for maintaining said brake shoes normally out of engagement with the brake drum with confronting ends of said brake shoes held in engagement with said anchor pin, electrically actuable means for moving said brake shoes into engagement with said brake drum, said electrically actuable means including a generally flat lever arm axially disposed between said web portion of one of said shoes and said brake backup plate, means pivotally securing one end of said lever arm at a pivot location to said brake backup plate at a pivotal axis between the central axis and said anchor pin and proximate to said confronting ends of said brake shoes, said lever arm being generally arcuately shaped with its opposite end normally being located substantially diametrically from said one end relative to the central axis and with a portion of said lever arm proximate said pivot location at said one end normally being in axial overlapping relation relative to said web portion of said one of said shoes, electromagnet assembly means secured to said lever arm at said opposite end and actuable for causing pivoting of said lever arm about said pivotal axis in opposite directions from its normal position in accordance with the direction of rotation of said brake drum and for moving said lever arm substantially out of overlapping relationship relative to said web of said one of said brake shoes responsively to movement in one direction, said lever arm having a radially outer edge of a generally arcuate contour and having a generally radially outwardly extending projection located proximate to said pivotal location at said one end and extending radially outwardly a distance such that said projection maintains said overlapping relationship with said web of said one of said brake shoes with said lever arm in its extreme position in said one direction and with the leading edge of said projection being in clearance relation to said anchor pin with said lever arm in its extreme position in the direction opposite to said one direction, and means on said lever arm engageable with said confronting ends of said brake shoes for moving said brake shoes into engagement with said brake drum responsively to pivotal movement of said lever arm about said pivotal axis.

4. In an automotive vehicle having an electric brake assembly operable with a brake drum rotatable about a central axis with the central axis movable in a forward direction in translation as the vehicle moves in a forward direction, the combination comprising primary and secondary brake shoes each having an arcuately shaped lining bearing portion and an upright web portion secured to said lining bearing portion with said primary shoe located on the forward side of the central axis and with said secondary shoe located on the opposite side of the central axis, a generally planar brake backup plate, means for securing said brake shoes to said brake backup plate and for maintaining said brake shoes normally out of engagement with the brake drum, electrically actuable means for moving said brake shoes into engagement with said brake drum, said electrically actuable means including a generally flat lever arm axially disposed between said web portion of said primary shoe and said brake backup plate, means pivotally securing one end of said lever arm at a pivot location to said brake backup plate at a pivotal axis eccentric to the central axis and proximate to confronting ends of said brake shoes, said lever arm being generally arcuately shaped and extending on said forward side of the central axis with its opposite end normally being located substantially diametrically from said one end relative to the central axis and with a portion of said lever arm proximate said pivot location at said one end normally being in axial overlapping relation relative to said web portion of said primary shoe, electromagnet assembly means secured to said lever arm at said opposite end and actuable for causing pivoting of said lever arm about said pivotal axis in opposite directions from its normal position in accordance with the direction of rotation of said brake drum and for moving said lever arm substantially out of overlapping relationship relative to said web of said primary shoe responsively to movement in one direction, said lever arm having a radially outer edge of a generally arcuate contour and having a generally radially outwardly extending projection located proximate to said pivotal location at said one end and overlapping said web of said primary brake shoe in the area of said projection a distance greater than the distance of the maximum relative separating movement between said web of said primary shoe and said lever arm at said area, and means on said lever arm engageable with said confronting ends of said brake shoes for moving said brake shoes into engagement with said brake drum responsively to pivotal movement of said lever arm about said pivotal axis.

5. In an automotive vehicle having an electric brake assembly operable with a brake drum rotatable about a central axis with the central axis movable in a forward direction in translation as the vehicle moves in a forward direction, the combination comprising primary and secondary brake shoes each having an arcuately shaped lining bearing portion and an upright web portion secured to said lining bearing portion with said primary shoe located on the forward side of the central axis and with said secondary shoe located on the opposite side of the central axis, a generally planar brake backup plate, means for securing said brake shoes to said brake backup plate and for maintaining said brake shoes normally out of engagement with the brake drum, electrically actuable means for moving said brake shoes into engagement with said brake drum, said electrically actuable means including a generally flat lever arm axially disposed between said web portion of said primary shoe and said brake backup plate, means pivotally securing one end of said lever arm at a pivot location to said brake backup plate at a pivotal axis eccentric to the central axis and proximate to confronting ends of said brake shoes, said lever arm being generally arcuately shaped and extending on said forward side of the central axis with its opposite end normally being located substantially diametrically from said one end relative to the central axis and with a portion of said lever arm proximate said pivot location at said one end normally being in axial overlapping relation relative to said web portion of said primary shoe, electromagnet assembly means secured to said lever arm at said opposite end and actuable for causing pivoting of said lever arm about said pivotal axis in opposite directions from its normal position in accordance with the direction of rotation of said brake drum and for moving said lever arm substantially out of overlapping relationship relative to said web of said primary shoe responsively to movement in one direction, said lever arm having a radially outer edge of a generally arcuate contour and having a generally radially outwardly extending projection located proximate to said pivotal location at said one end and overlapping said web of said primary brake shoe in the area of said projection a distance greater than the distance of the maximum relative separating movement between said web of said primary shoe and said lever arm at said area, a support pad secured to said backup plate proximate to an intermediate portion of said lever arm, and means on said lever arm engageable with said confronting ends of said brake shoes for moving said brake shoes into engagement with said brake drum responsively to pivotal movement of said lever arm about said pivotal axis.

6. In an automotive vehicle having an electric brake assembly operable with a brake drum rotatable about a central axis with the central axis movable in a forward direction in translation as the vehicle moves in a forward direction, the combination comprising primary and secondary brake shoes each having an arcuately shaped lining bearing portion and an upright web portion secured to said lining bearing portion with said primary shoe located on the forward side of the central axis and with said secondary shoe located on the opposite side of the central axis, a generally planar brake backup plate, an anchor pin secured to said backup plate and located substantially vertically upwardly from the central axis, means for securing said brake shoes to said brake backup plate and for maintaining said brake shoes normally out of engagement with the brake drum with confronting ends of said brake shoes held in engagement with said anchor pin, electrically actuable means for moving said brake shoes into engagement with said brake drum, said electrically actuable means including a generally flat lever arm axially disposed between said web portion of said primary shoe and said brake backup plate, means pivotally securing one end of said lever arm at a pivot location to said brake backup plate at a pivotal axis between the central axis and said anchor pin and proximate to said confronting ends of said brake shoes, said lever arm being generally arcuately shaped and extending on said forward side of the central axis with its opposite end normally being located substantially diametrically from said one end relative to the central axis and with a portion of said lever arm proximate said pivot location at said one end normally being in axial overlapping relation relative to said web portion of said primary shoe, electromagnet assembly means secured to said lever arm at said opposite end and actuable for causing pivoting of said lever arm about said pivotal axis in opposite directions from its normal position in accordance with the direction of rotation of said brake drum and for moving said lever arm substantially out of overlapping relationship relative to said web of said primary shoe responsively to movement in one direction, said lever arm having a radially outer edge of a generally arcuate contour and having a generally radially outwardly extending projection located proximate to said pivotal location at said one end and normally overlapping said web of said primary shoe in the area of said projection a distance greater than the distance of the maximum relative separating movement between said web of said primary shoe and said lever arm at said area with said lever arm in its extreme position in said one direction and with the leading edge of said projection being in clearance relation to said anchor pin with said lever arm in its extreme position in the direction opposite to said one direction, and means on said lever arm engageable with said confronting ends of said brake shoes for moving said brake shoes into engagement with said brake drum responsively to pivotal movement of said lever arm about said pivotal axis.

References Cited in the file of this patent
UNITED STATES PATENTS
2,273,065    Penrose _____ Feb. 17, 1942